United States Patent [19]

Maurer et al.

[11] 4,396,586
[45] Aug. 2, 1983

[54] PROCESS FOR MAKING LONG-CHAIN AMMONIUM POLYPHOSPHATE

[75] Inventors: Alexander Maurer, Hürth; Jürgen Stenzel, Mechernich-Kommern; Gero Heymer, Erftstadt, all of Fed. Rep. of Germany

[73] Assignee: Hoechst Aktiengesellschaft, Fed. Rep. of Germany

[21] Appl. No.: 309,902

[22] Filed: Oct. 9, 1981

[30] Foreign Application Priority Data

Oct. 15, 1980 [DE] Fed. Rep. of Germany ....... 3038836

[51] Int. Cl.³ ............................................ C01B 25/28
[52] U.S. Cl. .................................... 423/305; 423/315
[58] Field of Search ............................... 423/305, 315

[56] References Cited

U.S. PATENT DOCUMENTS

| | | | |
|---|---|---|---|
| 2,781,281 | 2/1957 | Berger | 423/305 |
| 3,333,921 | 8/1967 | Knollmueller et al. | 423/315 |
| 3,495,937 | 2/1970 | Yushen | 423/309 |
| 3,653,821 | 4/1972 | Heymer et al. | 423/305 |
| 3,723,074 | 3/1973 | Sears et al. | 423/305 |
| 3,775,315 | 11/1973 | Smith et al. | 423/309 |
| 3,912,802 | 10/1975 | McCullough et al. | 423/306 |
| 4,043,987 | 8/1977 | Joliceour et al. | |

FOREIGN PATENT DOCUMENTS 1442994 10/1976 Fed. Rep. of Germany .
1442995 4/1977 Fed. Rep. of Germany .
2330174 5/1977 Fed. Rep. of Germany .

OTHER PUBLICATIONS

Shen et al., "Preparation and Characterization of Crystalline Long-Chain Ammonium Polyphosphates", J. Amer. Chem. Soc. 91:62–66, (1969).

*Primary Examiner*—O. R. Vertiz
*Assistant Examiner*—Wayne A. Langel
*Attorney, Agent, or Firm*—Connolly and Hutz

[57] ABSTRACT

The invention relates to a process for making long chain ammonium polyphosphate consisting essentially of crystalline modification II. To this end, a mixture of phosphorus pentoxide and ammonium orthophosphate in a molar ratio of 1:0.9 to 1:1.1 is reacted with 0.1 to 15 mol % of melamine or its condensation products selected from melam, melem or mellon, calculated as melamine, at a temperature within the range 50° to 150° C. in the presence of an excess of ammonia and the reaction product is heat-treated at temperatures within the range 200° to 400° C.

7 Claims, No Drawings

PROCESS FOR MAKING LONG-CHAIN AMMONIUM POLYPHOSPHATE

The present invention relates to a process for making long chain ammonium polyphosphates consisting essentially of crystalline modification II.

Ammonium polyphosphate, briefly termed APP hereinafter, has been under commercial production for some time and successfully used for flameproofing purposes, e.g. for flameproofing plastics materials and painting compositions. Despite this, the commercially available products are not fully free from deficiencies, among wich the adverse effect on the viscosity of surrounding media which is of considerable interest to APP users. In an aqueous and also in an organic medium, commercially available APP effects a strong viscosity increase. As a result, the quantitative use of APP is naturally limited and compositions having APP incorporated therewith are exposed to heavy stress during the further processing treatment which they are subjected to. In some cases, the compositions even solidify while forming a stiff magma which is no longer pumpable and hence processable. For reasons of rendering compositions flameproof, it is, however, necessary for them to have a certain quantity of APP incorporated therewith; any reduction of this quantity would result in the flameproofing properties of the compositions being appreciably impaired. It is therefore highly desirable to have APP which leaves the viscosity of a surrounding medium practically unaffected so that it is possible for APP to be used in the quantities necessary to ensure flameproofness for the composition having the APP incorporated therewith.

The production of linear condensed ammonium polyphosphates from acid ammonium orthophosphates and with the aid of melamine has already been described in DE-PS No. 14 42 994. To this end, a feed mixture containing nitrogen and phosphorus in a molar ratio larger than 1:1 is heated to temperatures higher than 110° C. up to 450° C. The products so made have a distinctly glassy character and contain considerable proportions of oligomers which are responsible for the increase in viscosity the products undergo in an aqueous or organic suspension.

The same is true concerning the product obtained in DE-PS No. 14 42 995, wherein melamine is reacted with ammonium phosphate and phosphoric acid at temperatures within the range 180° to 350° C., and wherein a relatively large quantity of water is required to be removed from the system whenever phosphoric acid is used therein.

In U.S.-PS No. 4 043 987, the feed materials again are condensed phosphoric acids which are reacted with melamine at temperatures higher than 150° C. to a solid foam which subsequently has to be ground. In this case, it is once again necessary for the reaction mixture to be freed from relatively large quantities of water, and additional expensive processing steps have to be taken for grinding the solid foam.

In accordance with our present invention, we have now unexpectedly found that long chain crystalline ammonium polyphosphate consisting essentially of modification II is easy to produce by reacting a mixture of phosphorus pentoxide and ammonium orthophosphate in a molar ratio of 1:0.9 to 1:1.1, preferably 1:1, with 0.1 to 15 mol % of melamine, based on phosphorus pentoxide, the reaction being effected at a temperature within the range 50° to 150° C., preferably 50° to 100° C., in the presence of an excess of ammonia.

It is possible to replace the melamine by its condensation products, namely melam, melem or mellon, calculated as melamine. The reaction product which is obtained after a period of about 0.5 to 2 hours should preferably be heat-treated for a further 1 to 6 hours at temperatures within the range 200° to 400° C., equally under ammonia. This can be done inside the reactor used for effecting the reaction, or in a separate apparatus.

It is preferable for the feed mixture to comprise a mixture of $P_2O_5$, ammonium orthophosphate, and melamine or its condensation products, in which the molar ratio of nitrogen to phosphorus of all reactants is within the range 0.3:1 to 1:1. It is also preferable for the feed materials to be mixed and for the mixture to be introduced, or for them to be introduced one component immediately after the other, into a preheated reactor, in which the reaction should be effected with the use of an excess of ammonia. The feed materials are especially effectively used in all those cases in which the mixture is reacted with continuous agitation whereby the surface area of the material to undergo reaction becomes continuously renewed. To this end, use should be made of a reactor provided with suitable agitating and kneading implements.

By the steps taken in accordance with this invention which comprise addition of melamine or its condensation products and reaction under mild conditions, it is possible to obtain APP which has a surprisingly minor influence on the viscosity of the suspension medium and, at the same time, presents a pH-value higher than 5.5. The process of this invention compares favorably with the prior art methods, wherein use is made of C-N-compounds, e.g. urea and dicyandiamide, which are insufficiently stable under the reaction conditions and decompose immediately after introduction into the preheated reactor. As a result, large proportions of these addends remain unused and are lost. By their spontaneous decomposition into gaseous products, they may even prevent gaseous ammonia from going forward into the reaction material, so that APP with a low pH-value and irregular quality is obtained. As compared with this, melamine and its condensation products which are used in this invention could not be found under the present reaction conditions to produce these adverse effects. In clear contrast therewith, they permit the reaction to proceed under controlled conditions and give APP having the properties desirable for it.

APP made in accordance with this invention was found distinctly less adversely to affect the viscosity both in aqueous suspension and in an organic system, e.g. a polyol system. A 10% aqueous suspension of APP made by the process described in DE-PS No. 23 30 174 has a viscosity higher than 1000 mPa.s, whilst the products of this invention have a viscosity of less than 100 mPa.s and often even less than 50 mPa.s. The products behave similarly in organic solvents, e.g. a polyol system, in which APP made by this invention has a viscosity about 50% lower than that of APP made by the process described in DE-PS 23 30 174. Despite this, there is no reduction in the pH-values of the present products comparable with the reduced pH-value of those products which are made with the use of urea and derivatives thereof. A further beneficial effect of APP made by the present process resides in its solubility which is significantly reduced as compared with that of the products described in DE-PS No. 23 30 174. This has been found beneficially to influence the flameproofing properties of the present product which is less liable to be washed out than the prior art products. As a result, material having the present flameproofing system incorporated therewith remains reliably flameproof over longer periods than heretofore. APP made in accordance with this invention has distinct crystalline properties; it consists essentially of modification II (cf. SHEN, STAHLHEBER, DYROFF, J. Amer. Chem. Soc. 91, 62 (1969). This modification has been obtainable heretofore exclusively via the intermediate stage of modification I, i.e. by heating equimolar proportions of $NH_4H_2PO_4$ and urea over long periods of time to temperatures as high as 280° C. and subsequently heat-treating the resulting product over excessively long periods of time to temperatures within the range 200° to 375° C. As compared therewith, the present process is carried out at considerably lower reaction temperatures within shorter reaction periods, naturally with less expenditure of energy.

A special variant of the present process provides for recycle material originating from a previous batch, e.g. oversize and similar material, to be introduced into the reactor together with, or separately from, the feed material, the properties of the resulting APP remaining unaffected.

In other words, the present process yields APP whose properties make it a very good agent for flameproofing intumescent painting compositions, polyurethane foams and thermoplasts.

EXAMPLE 1

2650 g $P_2O_5$, 2470 g $(NH_4)_2HPO_4$ and 315 g melamine were introduced, one component immediately after the other, into a 10 liter reactor which was provided with rotating mixing and kneading means and preheated to 100° C. They were reacted for 1 hour at the temperature indicated, while the reactor was supplied with 500 l ammonia. Next, the temperature was increased to 250° C. and a further 400 l ammonia was introduced into the reactor within 3 hours. During that heat-treatment, the reaction material was continuously agitated. APP which consisted almost exclusively of modification II was obtained. It had a pH-value of 6.2 in a 1% aqueous suspension and 12% of it was soluble in a 10% aqueous suspension at 25° C. The 10% aqueous suspension had a viscosity of 26 mPa.s and a 30% suspension in a polyester polyol (adipic acid diethyleneglycolpolyester) had a viscosity of 47 Pa.s. The solubility in water and viscosity were determined by methods customary in the art.

EXAMPLE 2

The procedure was as in Example 1 save that only 31.5 g melamine was used. APP consisting predominantly of modification II was obtained. It had a pH-value of 6.0 and 10% of it was soluble. An aqueous suspension had a viscosity of 23 mPa.s and a suspension in a polyester polyol (cf. Example 1) had a viscosity of 50 Pa.s.

EXAMPLE 3

The procedure was as in Example 1, save that only 3.15 g melamine was used. APP consisting predominantly of modification II was obtained. It had a pH-value of 5.9 and 12% of it was soluble. The viscosity of the aqueous suspension was 32 mPa.s and that of the suspension in a polyester polyol (cf. Example 1) was 46 Pa.s.

EXAMPLE 4

(Comparative Example)

The procedure was as in Example 1 save that no melamine was added. APP which consisted predominantly of modification II with significant proportions of modification V was obtained. It had a pH-value of 5.4 and 15% of it was soluble. It had a viscosity of 28 mPa.s in aqueous suspension and a viscosity of 73 Pa.s in a polyester polyol (cf. Example 1)

EXAMPLE 5

(Comparative Example)

The procedure was as in DE-PS No. 23 30 174, Example 1. APP which consisted predominantly of modification V with significant proportions of modification II was obtained. It had a pH-value of 5.5 and 30% of it was soluble. The aqueous suspension had a viscosity of 2360 mPa.s and the suspension in a polyester polyol (cf. Example 1) had a viscosity of 90 Pa.s.

EXAMPLE 6

(Comparative Example)

The procedure was as in Example 1 but 75 g urea was added as a C-N-compound. APP which consisted predominantly of modification II was obtained. It had a pH-value of 4.8 and 19% of it was soluble. The aqueous suspension had a viscosity of 33 mPa.s and the suspension in a polyester polyol (cf. Example 1) had a viscosity of 82 Pa.s.

EXAMPLE 7

The procedure was as in Example 2, but the reaction was effected at a temperature of 50° C. APP consisting predominantly of modification II was obtained. It had a pH-value of 5.9 and 10% of it was soluble. The aqueous suspension had a viscosity of 41 mPa.s and the suspension in a polyester polyol (cf. Example 1) had a viscosity of 40 Pa.s.

EXAMPLE 8

The procedure was as in Example 2, but 850 g recycle material originating from a previous batch was additionally introduced into the reactor. APP consisting predominantly of modification II was obtained. It had a pH-value of 5.9 and 8% of it was soluble. The aqueous suspension had a viscosity of 20 mPa.s and the suspension in a polyester polyol (cf. Example 1) had a viscosity of 44 Pa.s.

We claim:

1. A process for making long chain ammonium polyphosphate consisting essentially of crystalline modification II by reacting orthophosphoric acid derivatives with a nitrogencontaining compound in the presence of ammonia at elevated temperatures, which comprises: reacting a mixture of phosphorus pentoxide and ammonium orthophosphate in a molar ratio of 1:0.9 to 1:1.1 with 0.1 to 15 mol % of melamine or its condensation products selected from the group consisting of melam, melem and mellon, calculated as melamine, based on phosphorus pentoxide, the reaction being effected at a temperature within the range 50° to 150° C. in the presence of an excess of ammonia and subsequently heat-treating the reaction product at temperatures within the range 200° to 400° C.

2. The process as claimed in claim 1, wherein a mixture of phosphorus pentoxide and ammonium orthophosphate in a molar ratio of 1:1 is used.

3. The process as claimed in claim 1, wherein the reaction is effected at a temperature within the range 50° to 100° C.

4. The process as claimed in claim 1, wherein the mixture to undergo reaction is a mixture of phosphorus pentoxide and ammonium orthophosphate and melamine or its condensation products, in which the molar ratio of nitrogen to phosphorus in all reactants is within the range 0.3:1 to 1:1.

5. The process as claimed in claim 1, wherein the feed materials are mixed and the mixture is introduced into a preheated reactor, or the feed materials are introduced successively thereinto, and the reaction is effected with the use of an excess of ammonia.

6. The process as claimed in claim 1, wherein the feed mixture is reacted with continuous agitation, the surface area of the mixture to undergo reaction being continuously renewed thereby.

7. A process for making long chain ammonium polyphosphate consisting essentially of crystalline modification II, which comprises:

reacting a mixture of phosphorus pentoxide and an ammonium orthophosphate in a molar ratio of 1:0.9 to 1:1.1 with 0.1 to 15 mol % of melamine or a condensation product thereof, calculated as melamine, based on phosphorus pentoxide, the reaction being effected at a temperature greater than 50° but less than 150° C. in the presence of an excess of ammonia; subsequently heat treating the reaction product at temperatures within the range of 200° to 400° C., and recovering the long chain ammonium polyphosphate which consists essentially of crystalline modification II.

* * * * *